Patented Jan. 30, 1940

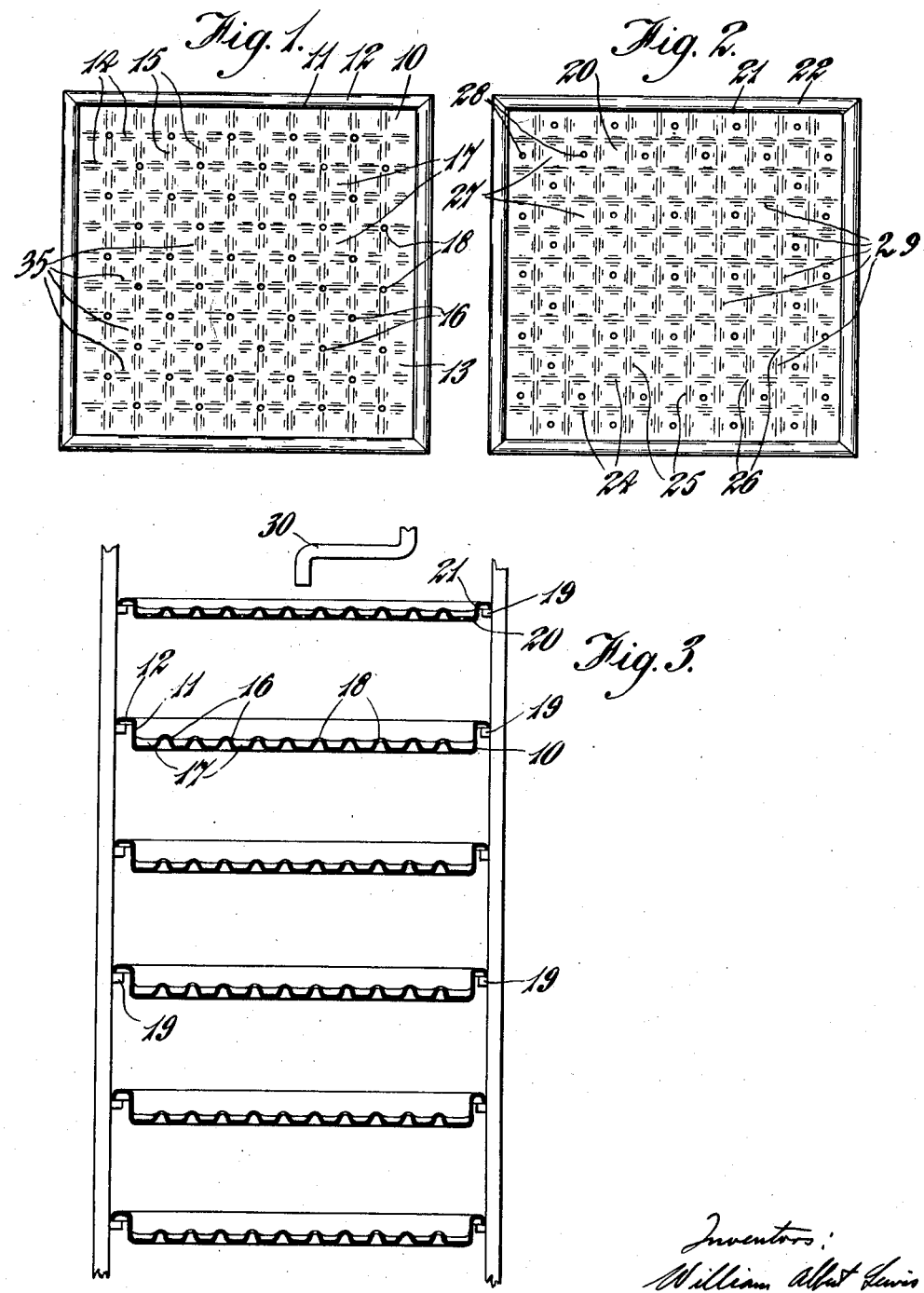

2,188,880

UNITED STATES PATENT OFFICE 2,188,880

TRAY FOR THE GERMINATION OF SEEDS

William Albert Lewis, Stockton-on-Tees, and Vivian de Courcy Dashwood, London, England, assignors to Intensive Cultivations Company, London, England, a British company Application September 17, 1937, Serial No. 164,292
In Great Britain September 21, 1936

6 Claims. (Cl. 47—1.2)

This invention relates to trays for the germination of seeds or grain and more particularly to the construction of such trays and to a method of distributing liquid to a predetermined amount over a plurality of superimposed germination trays.

One object of this invention is to provide a construction of germination tray which produces an even seed bed and which additionally allows even distribution of liquid such as water or nutrient solution for seed germination over the tray bed.

Another object of the invention is to provide a construction of germination tray which retains a predetermined quantity of liquid thereon and delivers surplus liquid to a lower level.

A further object of the invention is to provide an improved method of distributing liquid over a series of superimposed germination trays.

In order that the nature of the present invention may be better understood several embodiments shown by way of example in the drawing forming part of the specification will be described hereinafter from which further objects of the invention will be apparent. In the drawing:

Fig. 1 shows a plan view of a seed germination tray constructed according to the invention.

Fig. 2 shows a corresponding plan view of a tray intended to act more particularly as a liquid distributing tray.

Fig. 3 shows in diagrammatic form a plurality of superimposed trays mounted in a cabinet for seed germination.

Referring to Fig. 1, a seed germination tray 10 comprises an upstanding rim 11 flanged over as at 12 to provide a supporting device for the tray and a base 13. The base 13 of the tray is formed with a series of corrugations 14 extending from side to side of the tray, and a further series of corrugations 15 which extend from front to back of the tray. As will be clear from Fig 1 these corrugations cross one another and at the parts indicated at 35 in Fig. 1 which are intermediate the points of intersection of the corrugations the level of the ridge of the corrugations is lowered so that in effect a series of spaced humps or projections 16 is provided, each projection being surounded by troughs or concavities 17. Each of these concavities communicates with adjacent concavities over the lower ridge parts 35 to form a series of interconnected concavities.

At or adjacent the peak of some or all of the projections 16 there are formed orifices 18 preferably evenly distributed over the surface of the base 13. These orifices disposed at a certain distance above the base 13 provide overflow orifices for the tray so that liquid may be retained by the tray up to the height of the said orifices. Preferably the orifices 18 are all disposed at the same height above the base 13 so as to provide substantially simultaneous overflow through all the orifices to provide an even distribution of liquid on to a tray possibly disposed below the same. If desired the orifices may be formed with serrated edges so that the solution overflowing may fall in the form of a plurality of drops.

The arrangement of a plurality of such trays in a cabinet for seed germination is indicated diagrammatically in Fig. 3. Each tray is supported by its flange 12 on supporting ribs 19 so that the trays may be slid into and out of position. Any suitable number of trays may be superimposed one above the other.

When it is desired to supply water or nutrient solution to a series of superimposed trays as shown in Fig. 3 water is supplied to the uppermost tray in an amount sufficient to provide the total amount necessary for all the trays. When the depth of the liquid delivered to the uppermost tray reaches the overflow orifices therein it will drip through on to the next lower tray in a substantially evenly distributed manner and when the liquid on the next lower tray reaches the height of the overflow orifices therein it will again overflow and so on. An amount of liquid determined by the height of the overflow orifices is thus retained in each tray so that by the method of the invention it is only necessary to turn on a single supply cock (not illustrated) controlling the flow of liquid through a delivery pipe 30 (Fig. 3) which may for example be disposed centrally of the uppermost tray. The supply of liquid to all the trays then takes place automatically.

It may be preferred to use a slightly modified form of tray merely as a liquid distributing tray in the uppermost part of the cabinet. Such a tray is shown in Figs. 2 and 3. The uppermost tray 20 is provided with an upstanding rim 21 preferably of less height than the rim 11 and with an outward flange 22. In the same way as in the case of the tray 10 the liquid distributing tray is provided with two oppositely directed series of corrugations 24 and 25 in the manner described with reference to Fig. 1 form a series of humps 26 separated by concavities or hollows 27 intercommunicating over lower ridge parts 29. In certain of the hollows 27 orifices 28 may be provided so that the liquid delivery to the tray 20 will find its way readily through the orifices without necessarily rising to any height.

As shown in Fig. 2 the orifices are not distributed wholly evenly over the surface of the tray 20 but are more numerous adjacent the outer edges so that liquid delivery to the centre of the tray will be able to reach the edges and provide a comparatively even distribution. The provision of the humps or projections minimizes the risk of unequal distribution of liquid in the case where the tray may be somewhat inclined to the horizontal.

It is preferred to groove or corrugate the tray in at least two directions so as to provide interconnection of all the concavities thus providing an even flow of nutrient solution over the surface of the tray. By the construction of tray shown in Fig. 1 ready communication between all the concavities can be obtained at a level below that of the orifices 18. While the ridges or corrugations have been shown as at right angles to one another it is to be understood that they may extend in any suitable direction and at any suitable angle to one another.

It will be understood the trays constructed in accordance with the invention provide an even seed bed together with even distribution of liquid for the germination of the seeds. Further, they provide devices for obtaining a store of a mixture of nutrient solution of predetermined quantity which can be absorbed by the seeds and also an even supply of liquid from one tray to the next lower tray.

What we claim is:

1. In a soilless seed germination cabinet, a liquid retaining and distributing tray comprising a bed provided with a plurality of overflow orifices disposed at a predetermined height above and distributed throughout said bed and spaced concavities arranged around said orifices with adjacent concavities intercommunicating one with the other.

2. In a soilless seed germination cabinet, a liquid retaining and distributing tray comprising a base, a plurality of spaced projections formed in said base and provided adjacent their peaks with perforations forming overflow orifices, a plurality of concavities in said base surrounding each of said projections and means to provide intercommunication between said concavities at a level below said perforations.

3. In a soilless seed germination cabinet, a liquid retaining and distributing tray comprising a base, a plurality of spaced projections formed in said base and provided adjacent their peaks with perforations forming overflow orifices, a plurality of concavities in said bed surrounding each of said projections, the concavities between said spaced projections intercommunicating throughout the base of said tray in order to provide an even distribution of liquid.

4. In a soilless seed germination cabinet, the combination of a liquid-retaining and distributing tray comprising a base provided with a plurality of overflow orifices disposed at a predetermined height above and distributed throughout said base and with spaced concavities arranged around said orifices, adjacent concavities intercommunicating one with the other, and an uppermost liquid-distributing tray comprising a base, a plurality of intercommunicating concavities in said base and projections in said base intermediate said concavities, at least some of said concavities being provided with orifices.

5. In a soilless seed germination cabinet, the combination of a liquid-retaining and distributing tray comprising a base provided with a plurality of overflow orifices disposed at a predetermined height above and distributed throughout said base and with spaced concavities arranged around said orifices, adjacent concavities intercommunicating one with the other, and an uppermost liquid-distributing tray comprising a base, a plurality of intercommunicating concavities in said base and projections in said base intermediate said concavities, at least some of said concavities being provided with orifices, said orifices being in greater number nearer the periphery of said base than at its center.

6. In a soilless seed germination cabinet, a liquid-retaining and distributing tray comprising a base, an upstanding peripheral rim around said base, spaced concavities distributed over the area of said base, a plurality of projections located in the interspaces between concavities, at least some of said projections having overflow orifices at their upper ends, and means to provide intercommunication between adjacent concavities at a level below said overflow orifices.

WILLIAM ALBERT LEWIS.
VIVIAN DE COURCY DASHWOOD.